(12) United States Patent
Wang et al.

(10) Patent No.: US 11,031,195 B2
(45) Date of Patent: Jun. 8, 2021

(54) LASER PROCESSING OF FABRIC FOR ELECTRONIC DEVICES

(71) Applicant: Apple Inc., Cupertino, CA (US)

(72) Inventors: Paul X. Wang, Cupertino, CA (US); Joel N. Ruscher, Fremont, CA (US); Christopher T. Lebedeff, Santa Clara, CA (US); Sean Murphy, Sunnyvale, CA (US); Melody Kuna, Palo Alto, CA (US)

(73) Assignee: Apple Inc., Cupertino, CA (US)

(*) Notice: Subject to any disclaimer, the term of this patent is extended or adjusted under 35 U.S.C. 154(b) by 291 days.

(21) Appl. No.: 15/980,537

(22) Filed: May 15, 2018

(65) Prior Publication Data

US 2018/0337010 A1    Nov. 22, 2018

Related U.S. Application Data

(62) Division of application No. 14/844,257, filed on Sep. 3, 2015, now Pat. No. 9,997,305.

(51) Int. Cl.
*H01H 11/00* (2006.01)
*H01H 11/02* (2006.01)
(Continued)

(52) U.S. Cl.
CPC .......... *H01H 13/86* (2013.01); *D06M 10/005* (2013.01); *G06F 3/0202* (2013.01);
(Continued)

(58) Field of Classification Search
CPC .............. G06F 3/0202; H01H 2223/02; H01H 2223/003; H01H 13/14; H01H 13/704;
(Continued)

(56) References Cited

U.S. PATENT DOCUMENTS 3,928,736 A * 12/1975 Drage .................... H01H 13/12
200/5 A
5,061,830 A * 10/1991 Ambrose ............. H01H 13/702
200/5 A
(Continued)

FOREIGN PATENT DOCUMENTS

CN      101061697      10/2007
CN      103348580      10/2013
(Continued)

*Primary Examiner* — Paul D Kim
(74) *Attorney, Agent, or Firm* — Treyz Law Group, P.C.; G. Victor Treyz; Kendall W. Abbasi

(57) ABSTRACT

An electronic device such as a cover for a portable device or other electronic equipment may have circuitry mounted in a housing. The housing may be formed from layers of material such as fabric and polymer layers. The circuitry of the electronic device may include components mounted on a printed circuit. The components may include movable components such as keys in a keyboard. A fabric layer may overlap the keys. Border regions of the fabric layer that surround each key may be characterized by a stiffness. To ensure that the keys or other movable components in the device exhibit satisfactory stiffness levels, the keys can be tested and selected border regions or other fabric layer portions may be laser ablated or otherwise processed to locally reduce fabric layer stiffness.

20 Claims, 10 Drawing Sheets

(51) Int. Cl.
  *H01H 11/04* (2006.01)
  *H01H 65/00* (2006.01)
  *H01H 13/86* (2006.01)
  *G06F 3/02* (2006.01)
  *H04M 1/02* (2006.01)
  *H04M 1/23* (2006.01)
  *D06M 10/00* (2006.01)
  *H01H 13/704* (2006.01)
  *H01H 13/14* (2006.01)
  *H01H 13/70* (2006.01)
  *H01H 13/88* (2006.01)
  *H01H 13/705* (2006.01)

(52) U.S. Cl.
  CPC ............ *H01H 13/14* (2013.01); *H01H 13/70* (2013.01); *H01H 13/704* (2013.01); *H01H 13/705* (2013.01); *H01H 13/88* (2013.01); *H04M 1/0202* (2013.01); *H04M 1/23* (2013.01); *H01H 2223/003* (2013.01); *H01H 2229/02* (2013.01)

(58) Field of Classification Search
  CPC ...... H01H 13/705; H01H 13/86; H01H 13/88; H04M 1/0202; H04M 1/23; D06M 10/005
  See application file for complete search history.

(56) References Cited

U.S. PATENT DOCUMENTS

| | | |
|---|---|---|
| 5,358,344 A | 10/1994 | Spence |
| 6,861,961 B2 | 3/2005 | Sandbach et al. |
| 6,879,317 B2 | 4/2005 | Quinn et al. |
| 7,294,966 B2 | 11/2007 | Eckersley |
| 8,253,052 B2 | 8/2012 | Chen |
| 8,525,794 B2 | 9/2013 | Skillman |
| 8,872,168 B2 | 10/2014 | Choi et al. |
| 9,058,074 B2 | 6/2015 | Choi |
| 9,390,869 B2 | 7/2016 | Lee et al. |
| 9,588,551 B1 * | 3/2017 | Hegde ............... B29C 45/14786 |
| 2006/0202967 A1 | 9/2006 | Skillman et al. |
| 2011/0032127 A1 * | 2/2011 | Roush ................. H01H 13/785 341/34 |
| 2013/0216740 A1 | 8/2013 | Russell-Clarke et al. |
| 2014/0069791 A1 | 3/2014 | Chu et al. |

FOREIGN PATENT DOCUMENTS

| | | |
|---|---|---|
| CN | 103502002 | 1/2014 |
| CN | 103681061 | 3/2014 |
| CN | 103699181 | 4/2014 |
| EP | 2481556 | 8/2012 |
| EP | 2360901 | 9/2013 |
| GB | 1463370 | 2/1977 |
| WO | 2014/037755 | 3/2014 |

* cited by examiner

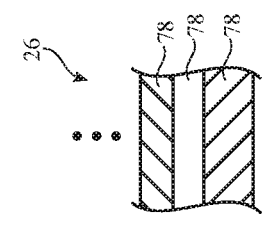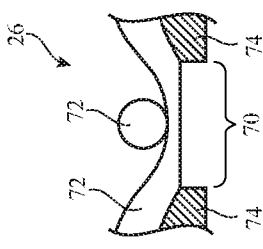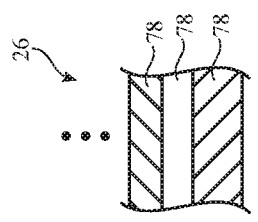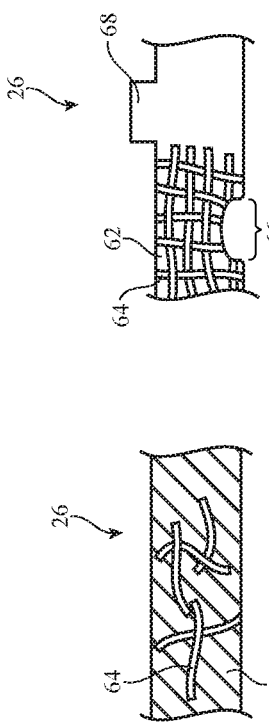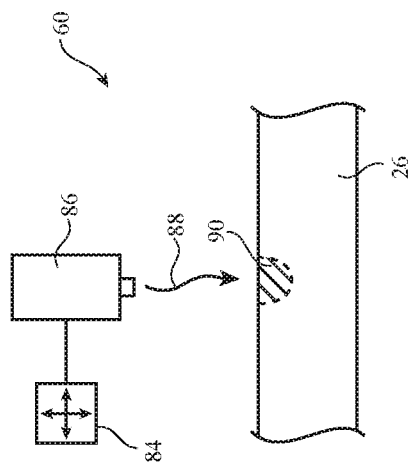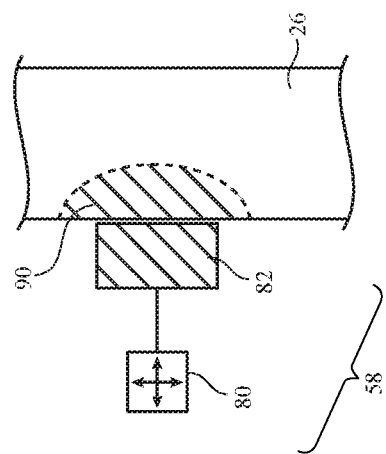

LASER PROCESSING OF FABRIC FOR ELECTRONIC DEVICES

This application is a division of U.S. patent application Ser. No. 14/844,257, filed Sep. 3, 2015, now U.S. Pat. No. 9,997,305, which is hereby incorporated by reference herein in its entirety.

BACKGROUND

This relates generally to electronic devices, and, more particularly, to processing fabrics and other materials for electronic devices.

Electronic devices such as computers, cellular telephones, and other devices include housing walls and other structures formed from materials such as plastic and metal.

The characteristics of electronic device structures such as housing walls and other structures may be subject to unavoidable manufacturing variations. For example, following an initial set of manufacturing operations, a portion of a layer for an electronic device may be stiffer than desired. If care is not taken, manufacturing variations can adversely affect manufacturing yield. In the absence of suitable rework techniques, parts may need to be discarded.

It would therefore be desirable to be able to provide improved techniques for fabricating electronic device structures.

SUMMARY

An electronic device such as a cover for a portable device or other electronic equipment may have circuitry mounted in a housing. The housing may be formed from layers of material such as fabric and polymer layers. The circuitry of the electronic device may include components mounted on a printed circuit. The components may include movable components such as keys in a keyboard.

A fabric layer in the housing may overlap the keys. Border regions of the fabric layer that surround each key may be characterized by a stiffness. To ensure that the keys in the device exhibit satisfactory stiffness levels, the keys can be tested. If certain keys are too stiff, border regions surrounding those keys may be processed using lasers or other processing equipment. For example, laser ablation techniques or other processing techniques may be used to ablate portions of a fabric layer, thereby removing fabric and reducing fabric stiffness in the border regions.

BRIEF DESCRIPTION OF THE DRAWINGS

FIG. 5 is a cross-sectional side view of an illustrative electronic device structure having fibers embedded in binder material in accordance with an embodiment.

FIG. 6 is a cross-sectional side view of an illustrative electronic device structure of the type that may include fabric and molded features in accordance with an embodiment.

FIG. 7 is a cross-sectional side view of an illustrative electronic device structure having a portion that has been removed using laser ablation in accordance with an embodiment.

FIG. 8 is a cross-sectional side view of an illustrative stack of electronic device structures for an electronic device in accordance with an embodiment.

FIG. 9 is a side view of illustrative equipment for applying heat to an electronic device structure with a heated element in accordance with an embodiment.

FIG. 10 is a side view of an illustrative laser-based tool for processing an electronic device structure in accordance with an embodiment.

DETAILED DESCRIPTION

An electronic device may have housing structures and other structures formed from plastic, metal, and other materials. Some structures may be formed from layers of material (e.g., plastic, metal, and/or other materials). Other structures may be formed from intertwined strands of material (e.g., fabric).

Laser processing and other processing techniques may be used to process fabric structures and other structures for an electronic device during manufacturing. For example, fabric layers may be modified during manufacturing to adjust fabric stiffness and other characteristics.

Figure 1:
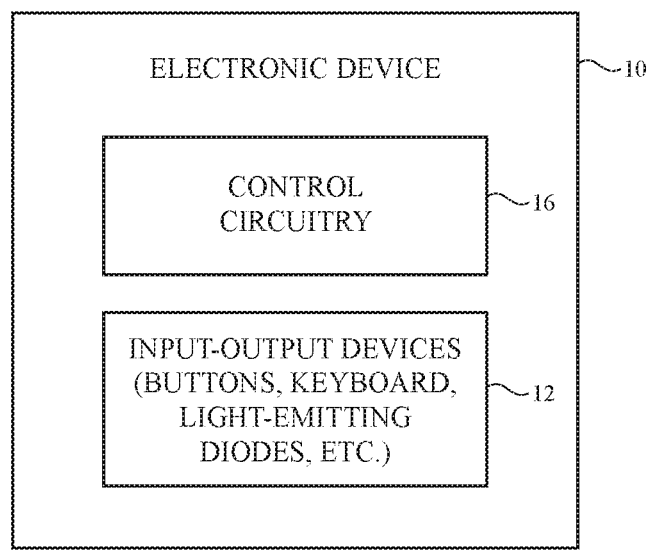
FIG. 1 is a schematic diagram of an illustrative electronic device in accordance with an embodiment.

A schematic diagram of an illustrative electronic device with structures that may be processed using laser processing techniques and other techniques is shown in FIG. 1. Device 10 may be a tablet computer, laptop computer, a desktop computer, a display, a cellular telephone, a media player, a wristwatch device or other wearable electronic equipment, headphones, an accessory such as a cover or other enclosure for an electronic device such as a tablet computer or other portable device, equipment embedded in a larger system, or other suitable electronic device.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, displays, etc. A user can control the operation of device 10 by supplying commands through input-output devices 12 and may receive status information and other output from device 10 using the output resources of input-output devices 12. If desired, device 10 may be coupled to an external device (e.g., a host device or an auxiliary device) using a cable and/or a wireless signal path. In this type of arrangement, device 10 may gather user input that is routed to the coupled external device and may receive information from the external device that is presented to the user with the output resources of device 10.

Figure 2:
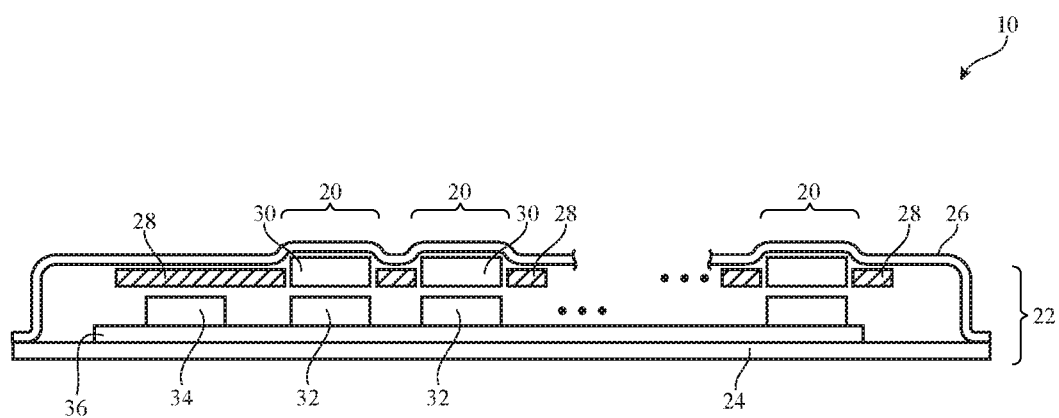
FIG. 2 is a cross-sectional side view of an illustrative electronic device in accordance with an embodiment.

FIG. 2 is a cross-sectional side view of an illustrative electronic device. In the example of FIG. 2, device 10 is a cover (or part of a cover) for a tablet computer or other electronic equipment. Device 10 may have housing structures formed from plastic, metal, glass, ceramic, carbon-fiber composites, fiberglass, and other fiber composites, fabric and other intertwined strands of material, and/or other materials. As an example, device 10 may have components that are mounted within a housing body formed from lower housing layer 24 and upper housing layer 26. Lower housing layer 24 may be formed from plastic, plastic with embedded microfibers, or other materials. Upper housing layer 26 may be formed from fabric. The fabric of layer 26 may include strands of material that have been intertwined using weaving techniques, knitting techniques, braiding techniques, or other techniques for intertwining strands of material.

The strands of material in the fabric of layer 26 may be polymer strands, metal strands, glass strands, strands of material that include a core of one material (e.g., polymer) that is coated with one or more additional materials (e.g., a metal layer, a dielectric outer coating, etc.). The strands of material in layer 26 may be monofilaments or multi-filament strands (sometimes referred to as yarn or thread).

Device 10 may include a keyboard (e.g., a computer keyboard for an associated tablet computer, laptop computer, or other computing equipment). The keyboard may have an array of keys 20 that are covered by fabric layer 26. Each key 20 may have a movable button member such as key cap 30 and an associated switch such as key switch 32. Key caps 30 may be mounted in openings in a support structure such as key web 28 (e.g., a plastic panel with rectangular openings and other openings configured to receive respective key caps 30 or other button members). Key web 36 may supply structural support for fabric layer 26 and may therefore form an internal frame for the upper housing wall of device 10. Key switches 32 may be mounted on substrate 36. Substrate 36 may be a printed circuit board that contains metal traces for forming signal paths to interconnect support circuitry 34 (e.g., one or more integrated circuits) with key switches 32.

Figure 3:
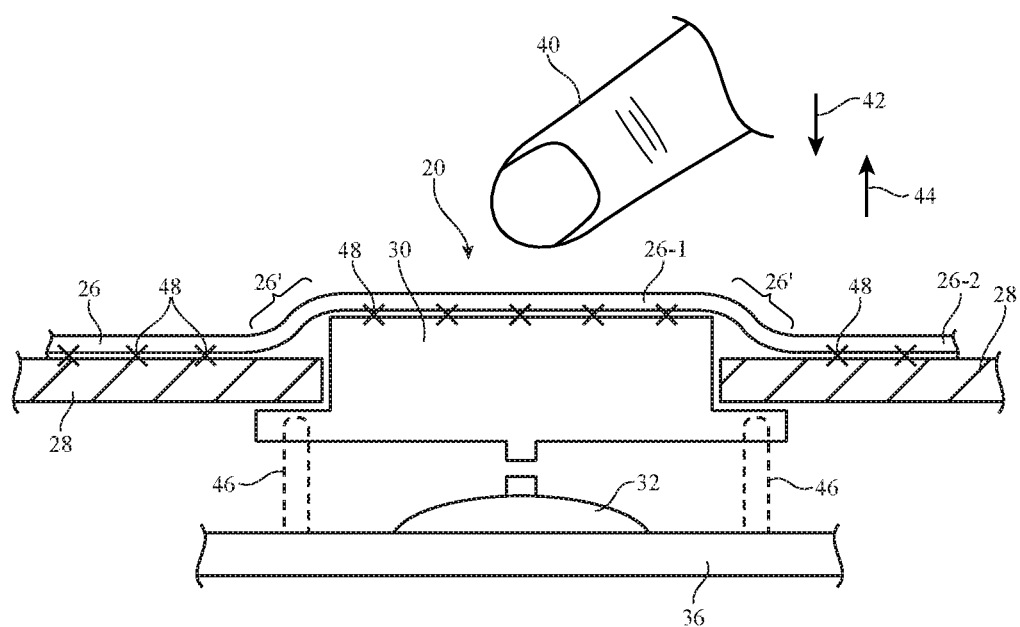
FIG. 3 is a cross-sectional side view of an illustrative key for a keyboard in accordance with an embodiment.

FIG. 3 is a cross-sectional side view of a portion of device 10. As shown in FIG. 3, key cap 30 may be aligned with key switch 32 so that key switch 32 may be actuated when a user's finger (finger 40) presses downwards in direction 42 on the key formed from key cap 30 and switch 32. Switch 32 may be a dome switch or other switch mounted on printed circuit 36. Support structures 46 (e.g., a butterfly mechanism or other hinge mechanism) may be used to provide support for key cap 30 and may provide a restoring force that biases key cap 30 upwards in direction 44 when the user releases the key.

Fabric layer 26 may be attached to the upper surface of device 10 and may cover key web 28 and the upper surfaces of key caps 30 in keys 20. Adhesive 48, injection-molded portions of key web 28, or other suitable attachment mechanisms may be used to attach portion 26-2 of fabric layer 26 to key web 28 and to attach portion 26-1 of fabric layer 26 to key caps 30. The key cap in each key may be surrounded by peripheral portions 26' of fabric layer 26. If, for example, key caps 30 are rectangular, peripheral portions 26' may have the shape of rectangular rings. The peripheral boundary portion 26' of fabric layer 26 that surrounds each key 20 is preferably sufficiently flexible to allow key caps 30 to travel freely both in outwards direction 44 and inwards direction 42 during use of the keyboard by a user.

If desired, the flexibility of fabric portions 26' and/or the properties of other structures in device 10 may be adjusted during manufacturing. Equipment of the type that may be used in making these types of adjustments to fabric layer 26 and other device structures is shown in FIG. 4.

Figure 4:
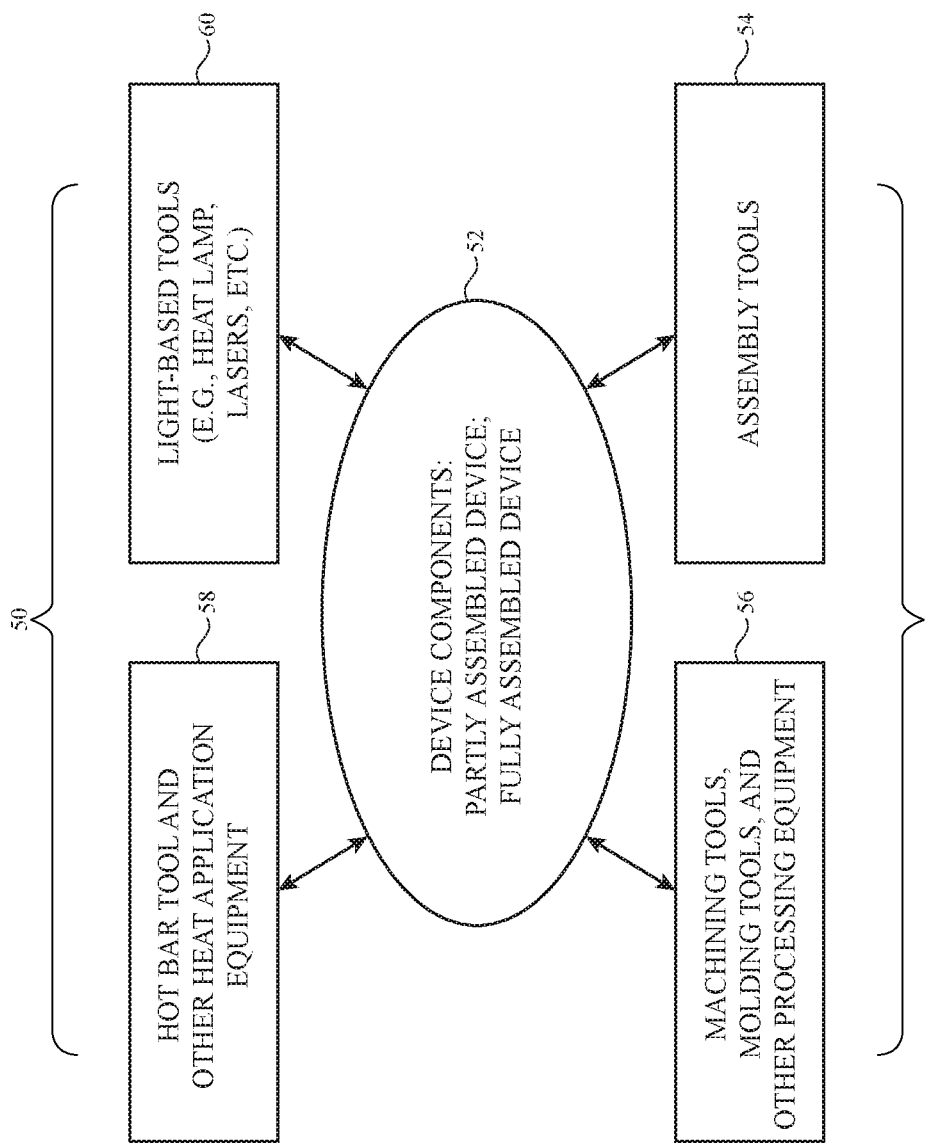
FIG. 4 is a diagram of illustrative equipment of the type that may be used in processing structures for an electronic device in accordance with an embodiment.

As shown in FIG. 4, structures 52 (e.g., device components, partly assembled devices such as fabric layer 26 and other structures of the type shown in FIG. 3, and/or fully assembled devices 10) may be processed using equipment 50.

Equipment 50 may include equipment for applying heat to structures 52 such as equipment 58. Equipment 58 may include a hot bar tool or other tool that produces heat to soften, melt, cure, or otherwise modify structures 52. A hot bar tool may include a heated metal member that can be placed into contact with a portion of structures 52. Heated embossing equipment (e.g., heated metal die structures that can be used to emboss a desired pattern onto a layer of fabric or other material that is compressed between the die structures) and/or other heated structures may be included in equipment 50.

Light-based tools 60 may also be used to process structures 52. Tools 60 may include sources of light such as lasers, light-emitting diodes, and lamps. Tools 60 may emit ultraviolet light, visible light, and/or infrared light. The light emitted by tools 60 may include wide area illumination and/or focused beams. Light may be emitted continuously (e.g., using a continuous wave laser) or may be emitted in pulses (e.g., to perform laser ablation operations). Tools 60 may emit laser pulses having durations of $10^{-15}$-$10^{-12}$ seconds, $10^{-15}$-$10^{-9}$ seconds, longer than on picosecond, shorter than one picosecond, longer than one nanosecond, shorter than one nanosecond, between one femtosecond and one millisecond, or other suitable durations. Short pulses may have high energy densities and may be suitable for ablating (vaporizing) polymers and other materials without melting nearby structures. Short pulses, longer duration pulses, and/or continuous wave light beams may be used in softening and/or melting polymers and other materials.

If desired structures 52 may be processed using additional tools 56 such as machining tools (e.g., a milling machine, drill, grinding equipment, etc.), molding tools (e.g., plastic injection molding tools and other equipment for molding plastic), tumbling equipment (e.g., equipment for softening fabric), chemical baths (e.g., for electroplating, for modifying the surfaces of structures 52, for etching, etc.), printing equipment (e.g., screen printing tools, inkjet printing tools, etc.), photolithographic tools, ovens, cutting tools, and/or other equipment for processing structures 52.

Assembly tools 54 may be used in attaching components together to form assemblies and may be used in joining components and/or assemblies to form finished devices. Assembly tools 54 may include manually controlled tools and computer-controlled robotic assembly equipment.

The material that forms layer 26 of device 10 may include plastic, metal, glass, other materials, and/or combinations of these materials. As shown in the example of FIG. 5, layer 26 may be formed from strands of material such as strands 64 that have been embedded within a binder such as binder 62 (e.g., a cured polymer resin). As shown in FIG. 6, layer 26 may be embossed or molded to form protrusions such as protrusion 68 and recesses such as recess 66. Strands 64 may be embedded within binder 62 and/or may include portions that are uncoated with any binder material. Portions of layer 26 may also be free of strands 64. Embossing or molding equipment for processing layer 26 may include structures that apply a desired pattern (e.g., a desired surface topology) to layer 64 under heat and pressure (as an example).

In the example of FIG. 7, layer 26 is a fabric layer having strands 72 (e.g., yarn or other strands) that have been intertwined (e.g., woven, knitted, braided, etc.) and coated on one side with coating layer 74. Coating layer 74 may be, for example, a polymer coating that forms a backing layer for the fabric layer formed from strands 72. After forming the fabric layer from strands 72 and after coating the underside of the fabric layer with coating layer 74, a pulsed laser or other light source may be used to remove a portion of coating layer 74 and a portion of one or more strands 72 (e.g., laser ablation may be used to ablate coating 74 and strands 72 to form recess (opening) 70.

As shown in FIG. 8, layer 26 may include one or more layers of material such as layers 78. Layers 78 may be formed from foam, solid plastic or other solid materials, fabric, etc. Layers such as illustrative layer 26 of FIG. 8 may be embossed, molded, cut, machined, processed with a laser (e.g., a laser ablation tool), or otherwise processed using equipment 50 of FIG. 4.

FIG. 9 is a diagram of an illustrative hot bar tool. Tool 58 includes a heated member such as heated member 82 (e.g., a heated metal member). Computer-controlled positioner 80—may adjust the position of heated member 82. In the example of FIG. 9, heated member 82 has been placed in contact with the surface of layer 26 and has applied heat to portion 90 of layer 26 (e.g., to cure adhesive in portion 90, to soften or melt plastic or other materials in portion 90, etc.).

FIG. 10 is a diagram of an illustrative light-based tool such as a laser tool. Tool 60 includes laser 86. Laser 86 produces laser beam 88. Computer-controlled positioner 84 may adjust the position of laser 86 and thereby adjust the position of laser beam 88. If desired, ancillary beam steering structures such as adjustable mirrors may be used to adjust the position of laser beam 88. Laser beam 88 may be a pulsed laser beam that ablates material from layer 26 in the region that is exposed to beam 88 (e.g., portion 90) or may be a continuous wave laser beam. Portion 90 may be heated to soften or melt portion 90 of layer 26, may be ablated to remove portion 90, may be cured by the light and/or heat associated with beam 88, or may otherwise by processed by exposure to light 88.

It may be desirable to use equipment 50 to process portion 26' of layer 26 to adjust the stiffness of portion 26' of layer 26. Adjustments to the stiffness of layer 26 may be made to ensure that the amount of force associated with depressing and releasing each key 20 (i.e., the "click feel" of key 20) is within desired limits. For example, portion 26' (or other portions of layer 26) may be processed using tool 60 to apply laser light 88, using tool 58 to apply heat, or using other equipment 50 to modify portion 26'.

Figure 11:
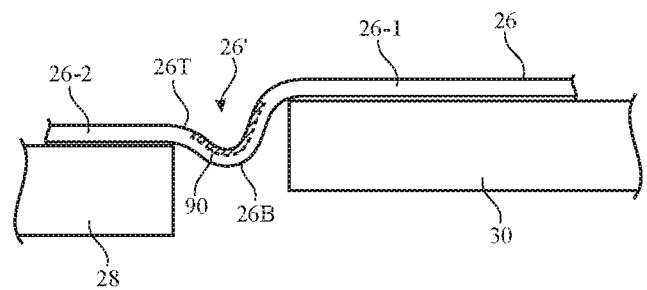
FIG. 11 is a cross-sectional side view of an illustrative electronic device structure such as a fabric layer in an illustrative configuration in which the fabric layer is being processed on its outer surface in accordance with an embodiment.

In the illustrative configuration of FIG. 11, region 90 on upper surface 26T of portion 26' is being processed (e.g., by exposure to laser light 88, heat, etc.) without modifying lower surface 26B. Portion 90 may form a melted region, a recess (e.g., a groove or pit that has been formed by removing material using laser ablation techniques) or other processed portion in layer 26.

Figure 12:
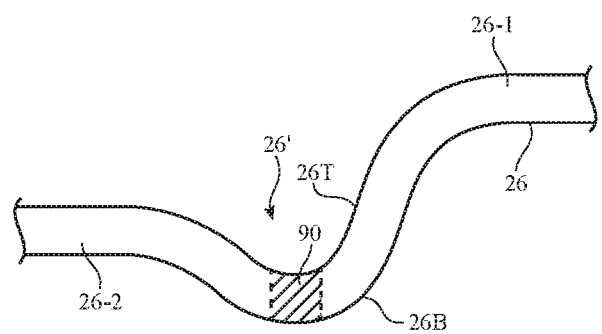
FIG. 12 is a cross-sectional side view of an illustrative electronic device structure such as a fabric layer in an illustrative configuration in which the fabric layer is being perforated in accordance with an embodiment.

In the illustrative configuration of FIG. 12, processed portion 90 extends through portion 26' of layer 26. Processed portion 90 of FIG. 12 may be, for example, an opening such as a circular or rectangular hole or a melted region that passes from upper (outer) surface 26T to lower (inner) surface 26B.

Figure 13:
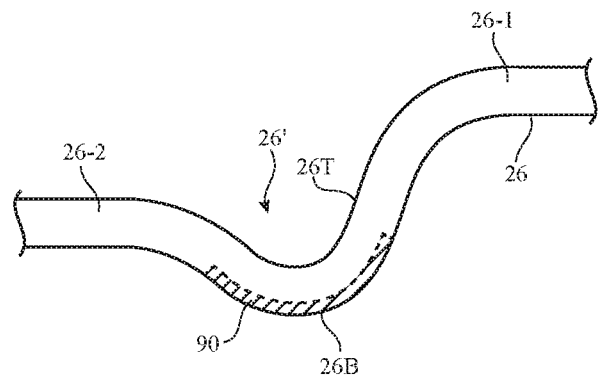
FIG. 13 is a cross-sectional side view of an illustrative electronic device structure such as a fabric layer in an illustrative configuration in which the fabric layer is being processed on its inner surface in accordance with an embodiment.

FIG. 13 shows an illustrative processing arrangement for portion 26' in which region 90 on lower surface 26B of portion 26' is being processed (e.g., by exposure to laser light 88, heat, etc.) without modifying upper surface 26T. As with the arrangement of FIG. 11, portion 90 of FIG. 13 may form a melted region, a recess (e.g., a groove or pit that has been formed by removing material using laser ablation techniques), or other processed portion in layer 26.

Figure 14:
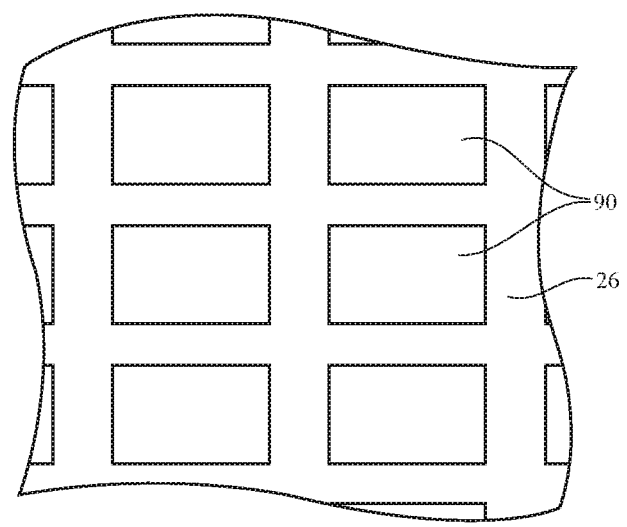
FIGS. 14, 15, 16, and 17 are top views of illustrative processing patterns that may be used in modifying an electronic device structure such as a layer of fabric in accordance with an embodiment.
Figure 15:
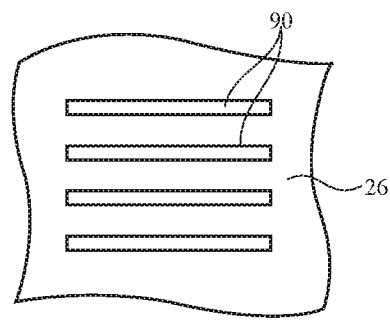
Figure 16:
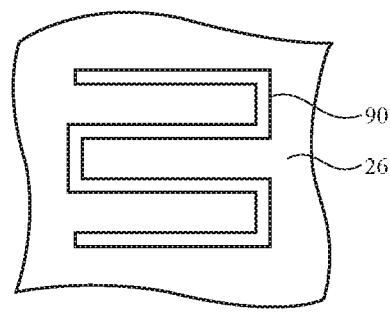
Figure 17:
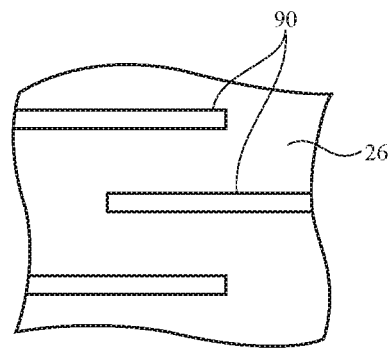

If desired, equipment 50 may be used to form an array of processed areas in the upper surface, lower surface, and/or both upper and lower surfaces of layer 26, as shown by portions 90 of FIG. 14. FIG. 15 is a diagram showing how processed region 90 may include parallel lines (e.g., grooves, slots, etc.). In the example of FIG. 16, processed region 90 has the shape of a serpentine line. Line-shaped regions may be formed by exposing the entire line to laser light at the same time or by scanning a focused laser beam across the surface of layer 26. FIG. 17 shows how processed region 90 may include two sets of interleaved lines. Other patterns for processed region(s) 90 may be used when processing layer 26, if desired.

Portions of layer 26 adjacent to keys 20 may be processed to adjust the stiffness of keys 20. In particular, each key 20 may be surrounded by a rectangular border or other border (i.e., peripheral portion 26' of layer 26). The stiffness of keys 20 can be adjusted by selectively processing borders 26' using equipment 50. For example, testing may be performed on each key 20 in a keyboard in device 10 to determine which keys are stiffer than desired. The border 26' of each overly stiff key may then be processed using a laser ablation tool. The laser ablation tool (e.g., tool 60 of FIG. 10) may remove selected portions of stiff border regions 26' to reduce the stiffness of these regions and thereby reduce the stiffness of the keys that are associated with these regions to appropriate levels.

Some or all of peripheral region 26' surrounding keys 20 may be processed. Illustrative processing patterns (patterns for processed regions 90 adjacent to keys 20) are shown in FIGS. 18, 19, 20, 21, 22, and 23. Processed regions 90 may include portions of layer 26 that have been processed on the outer surface of layer 26, portions of layer 26 that have been processed on the inner surface of layer 26, portions of layer 26 that have been processed to form through holes (e.g., perforations) that pass between the outer and inner surfaces of layer 26, portions of layer 26 from which material has been removed by laser ablation, portions of layer 26 that have been melted or cured, etc.

Figure 18:
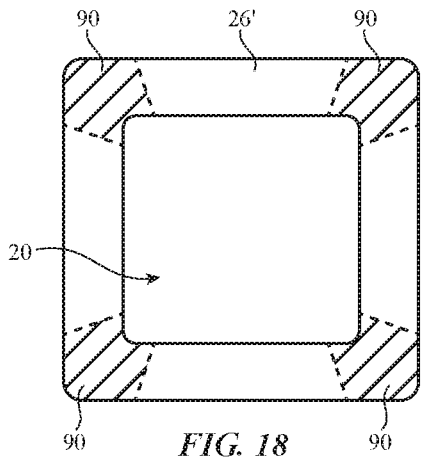
FIGS. 18, 19, 20, 21, 22, and 23 are illustrative border region processing patterns that may be used to modify an electronic device structure such as a fabric layer for a key in a keyboard in accordance with an embodiment.

In the example of FIG. 18, region 26' has a rectangular (square) shape with four sides and four corners. Processed regions 90 overlap the corners. In the FIG. 18 example, all four corners have been processed. Fewer corners of region 26' may be processed if desired. All four corners may be processed in the same way (laser beam power, laser beam pulse duration, etc.) or different corners may be processed differently.

Figure 19:
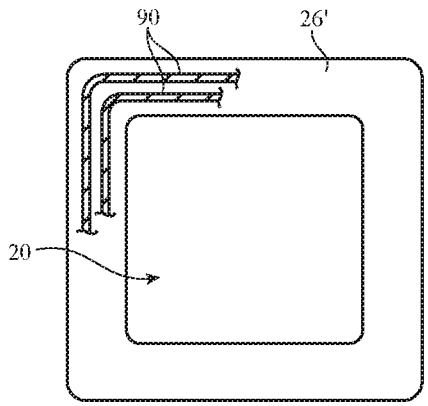

FIG. 19 shows how processed region 90 may include a series of elongated parallel regions. These regions may be include grooves that pass partly through layer 26 and/or slots (elongated openings) that pass entirely through layer 26. The parallel regions of FIG. 19 may run parallel to the outline of border 26' and may be continuous (e.g., the lines may be grooves having rectangular ring shapes) or may be discontinuous.

Figure 20:
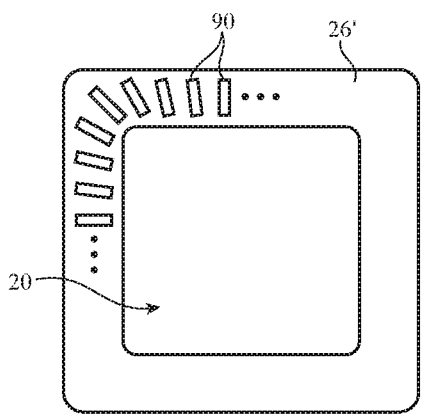
Figure 21:
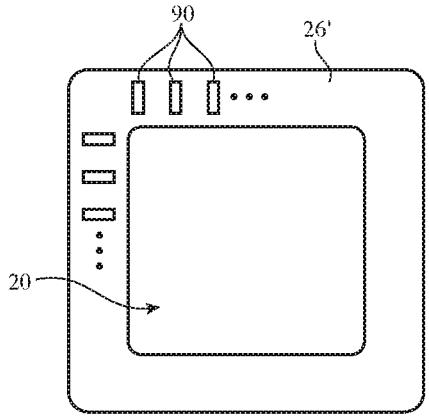
Figure 22:
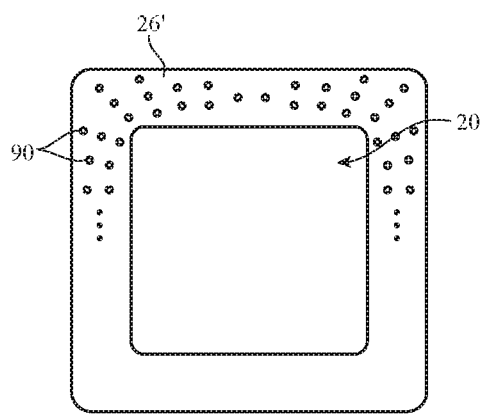
Figure 23:
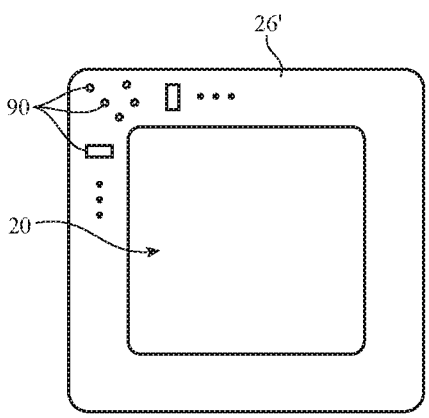

FIG. 20 shows how regions 90 may be grooves or slots that extend radially outward from the center of key 20. In the FIG. 21 example, regions 90 have the shape of vertically and horizontally oriented rectangles. FIG. 22 shows how regions 90 may have circular or elliptical shapes. Regions 90 of other shapes (e.g., triangles, pentagons, hexagons, etc.) may also be used. In FIG. 23, regions 90 include a combination of shapes such as rectangles and circles. Other combinations of shapes (lines with curved portions, lines with straight portions, shapes with combinations of curved and/or straight edges, etc.) may also be used.

By adjusting the stiffness of fabric 26 adjacent to keys 20 (e.g., in peripheral ring-shaped regions such as regions 26' that run along the edges of key caps 30), the performance of keys 20 can be adjusted during manufacturing to overcome variations in stiffness (e.g., fabric stiffness variations in scenarios in which layer 26 includes a fabric layer). Other properties of a fabric layer or a layer 26 of other materials may also be modified to adjust characteristics such as stiffness, height, density, porosity, smoothness, reflectivity, etc.

Figure 24:
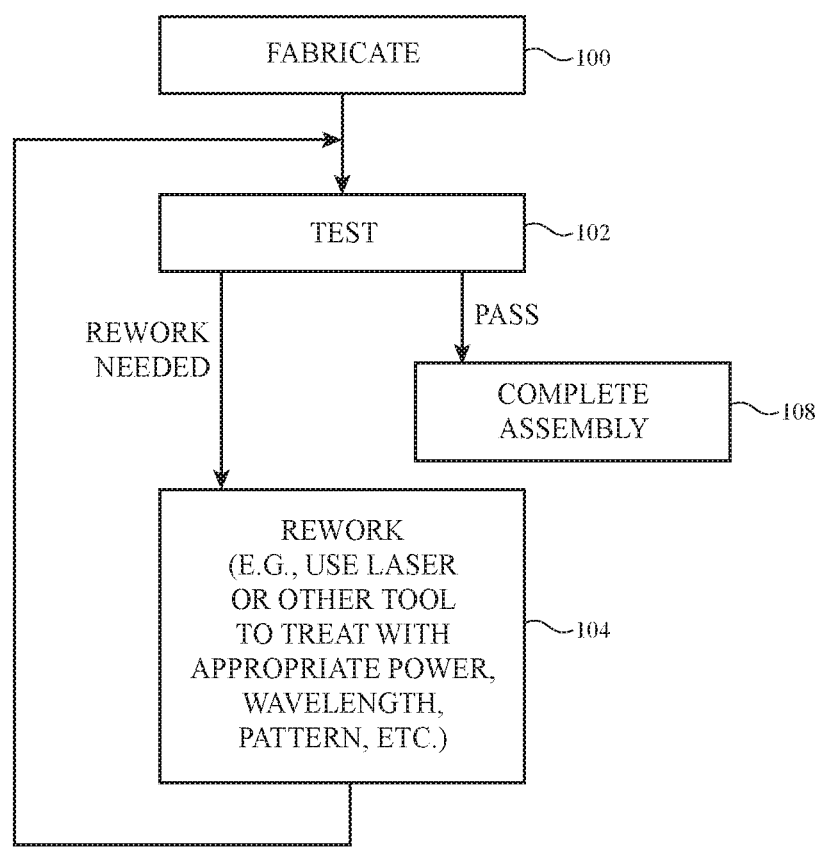
FIG. 24 is a flow chart of illustrative steps involved in fabricating electronic device structures such as fabric-based structures using processing equipment of the type shown in FIG. 4 in accordance with an embodiment.

FIG. 24 is a flow chart of illustrative steps involved in forming a device such as device 10. The processing operations of FIG. 24 include processing operations on structures 52 using equipment 50 (FIG. 4). With one suitable arrangement, which is described herein as an example, device 10 includes a keyboard with keys 20 and device structures 52 include a layer of fabric such as fabric 26 that overlaps keys 20. Fabric 26 may include woven strands of material such as woven polyester yarn (e.g., 50D/36F yarn) or other intertwined strands of material. A polymer backing layer (e.g., a polyurethane coating) and, if desired, a layer of adhesive, may be applied to the inner surface of fabric 26 (see, e.g., layer 74 of FIG. 7). Other types of electrical devices and device structures may be processed using equipment 50 if desired. The use of equipment 50 to process a layer of material such as layer 26 that includes woven polymer yarn is merely illustrative.

At step 100, device 10 may be fully or partly assembled. For example, key switches 32 and other circuitry may be mounted on printed circuit 36, key caps 30 may be mounted in openings in a key cap support layer such as key web 28 may be aligned with key switches 32, and a covering structure such as fabric layer 26 may be attached to the upper surface of key caps 30 and key web 28.

All or part of device 10 may be tested at step 102. For example, key performance can be measured using robotic test equipment that presses and releases each key 20 while gathering force measurements. These force measurements can then be compared to predetermined desired force ranges or other predetermined performance criteria. In response to determining that keys 20 (or other tested device structures) satisfy the performance criteria, assembly operations for device 10 can be completed at step 108.

In response to determining that one or more keys 20 (or other tested device structures) do not satisfy the performance criteria, rework operations can be performed on device structures 52 at step 104. If portions of layer 26 such as portions 26' adjacent to keys 20 are too stiff, these portions can be processed to reduce the stiffness to acceptable levels. For example, a portion of the yarn and backing layer material in fabric layer 26 may be selectively removed via laser ablation (e.g., using patterns of the type shown in FIGS. 18, 19, 20, 21, 22, and 23). Through holes (perforations) or recesses that pass only partway through layer 26 may be formed in processed areas 90.

The presence of the laser ablated regions may locally weaken fabric 26. By making regions 26' of fabric 26 weaker in this way, the stiffness of regions 26' and therefore the stiffness of the keys associated with these regions may therefore be reduced. After modifying regions 26' during the processing operations of step 104, additional testing may be performed at step 102. If the tests are unsatisfactory, additional rework operations may be performed at step 104. If the tests are satisfactory, assembly may be completed at step 108.

The foregoing is merely illustrative and various modifications can be made by those skilled in the art without departing from the scope and spirit of the described embodiments. The foregoing embodiments may be implemented individually or in any combination.

What is claimed is:

1. A method of forming a fabric keyboard, comprising:
   mounting first and second movable members to a substrate;
   covering the first and second moveable members with a fabric, wherein the fabric has first, second, and third portions, wherein the first and second portions respectively overlap the first and second movable members, and wherein the third portion is interposed between the first and second portions; and
   reducing a stiffness of the third portion of the fabric.

2. The method defined in claim 1 wherein reducing the stiffness of the third portion of the fabric comprises laser ablating the third portion of the fabric.

3. The method defined in claim 2 wherein laser ablating the third portion of the fabric comprises forming a recess in the third portion of the fabric that passes only partway through the fabric.

4. The method defined in claim 2 wherein laser ablating the third portion of the fabric comprises forming a through-hole in the third portion of the fabric.

5. The method defined in claim 1 wherein reducing the stiffness of the third portion of the fabric comprises removing a material from the fabric.

6. The method defined in claim 1 wherein the fabric comprises a woven fabric with polymer strands, the method further comprising:
   removing at least some polymer material from the polymer strands.

7. The method defined in claim 6 wherein removing at least some polymer material from the polymer strands comprises laser ablating the polymer strands.

8. The method defined in claim 1 wherein the third portion extends around a perimeter of the first portion.

9. The method defined in claim 8 wherein reducing the stiffness of the third portion comprises forming perforations around the perimeter of the first portion.

10. The method defined in claim 8 wherein reducing the stiffness of the third portion comprises forming recesses around the perimeter of the first portion.

11. A method of forming a keyboard, comprising:
mounting a keyboard key to a substrate;
covering the keyboard key with a layer of fabric, wherein the layer of fabric has a first region that overlaps the keyboard key and a second region that is offset from the keyboard key; and
removing a material from the second region of the layer of fabric to reduce a stiffness of the second region of the layer of fabric.

12. The method defined in claim 11 wherein the removing material from the second region of the layer of fabric comprises laser ablating the second region of the layer of fabric.

13. The method defined in claim 11 wherein the second region comprises a rectangular ring having four corners and wherein the removing material from the second region of the layer of fabric comprises removing the material from the four corners.

14. The method defined in claim 11 wherein the second region comprises a rectangular ring having four sides and wherein removing the material from the second region of the layer of fabric comprises forming perforations in each of the four sides.

15. A method of forming an electronic device, comprising:
mounting a component on a substrate;
covering the component with a layer of material; and
adjusting a stiffness associated with a layer of material in a region of the layer of material adjacent to the component.

16. The method defined in claim 15 wherein the component comprises a keyboard key and wherein adjusting the stiffness comprises processing a border region of the layer of material surrounding the keyboard key.

17. The method defined in claim 16 wherein the layer of material comprises a fabric and wherein adjusting the stiffness comprises adjusting a fabric stiffness for the fabric in the border region.

18. The method defined in claim 17 wherein adjusting the stiffness comprises applying a laser light to the fabric in the border region.

19. The method defined in claim 18 wherein the substrate comprises a printed circuit and wherein mounting the component comprises soldering the keyboard key to the printed circuit, the method further comprising:
soldering a plurality of additional keyboard keys to the printed circuit.

20. The method defined in claim 18 wherein applying the laser light comprises ablating portions of the fabric in the border region with pulses of the laser light.

\* \* \* \* \*